(12) United States Patent
White

(10) Patent No.: US 9,091,135 B2
(45) Date of Patent: Jul. 28, 2015

(54) APPARATUS FOR SEPARATING SPENT DRILLING MATERIALS

(71) Applicant: Calvin White, Woodward, OK (US)

(72) Inventor: Calvin White, Woodward, OK (US)

( * ) Notice: Subject to any disclaimer, the term of this patent is extended or adjusted under 35 U.S.C. 154(b) by 238 days.

(21) Appl. No.: 13/688,957

(22) Filed: Nov. 29, 2012

(65) Prior Publication Data

US 2014/0144327 A1     May 29, 2014

(51) Int. Cl.
*E21B 21/06* (2006.01)
*B01D 21/00* (2006.01)

(52) U.S. Cl.
CPC .............. *E21B 21/065* (2013.01); *B01D 21/00* (2013.01)

(58) Field of Classification Search
CPC ............................ B01D 19/00; B01D 19/0063
USPC ............. 96/168, 171, 169, 170, 156; 95/24, 1
See application file for complete search history.

(56) References Cited

U.S. PATENT DOCUMENTS

| | | | | |
|---|---|---|---|---|
| 1,554,471 A | * | 9/1925 | Trumble | 96/168 |
| 1,727,733 A | * | 9/1929 | Stovall | 95/260 |
| 1,756,288 A | * | 4/1930 | Gray et al. | 96/168 |
| 1,887,111 A | * | 11/1932 | Adams | 96/168 |
| 2,016,641 A | * | 10/1935 | Lincoln | 96/168 |
| 2,353,833 A | * | 7/1944 | Kimmell | 96/171 |
| 2,489,370 A | * | 11/1949 | Fowler | 96/190 |
| 2,493,095 A | * | 1/1950 | Williams | 96/168 |
| 2,861,647 A | * | 11/1958 | Musslewhite | 96/168 |
| 2,869,673 A | * | 1/1959 | Erwin | 96/168 |
| 2,997,053 A | * | 8/1961 | Walker et al. | 137/202 |
| 3,021,709 A | * | 2/1962 | Walker et al. | 73/200 |
| 3,252,473 A | * | 5/1966 | Erickson et al. | 137/174 |
| 4,010,012 A | * | 3/1977 | Griffin et al. | 96/159 |
| 4,097,253 A | * | 6/1978 | Phillips et al. | 96/168 |
| 4,355,652 A | * | 10/1982 | Perkins | 137/15.04 |
| 4,390,037 A | * | 6/1983 | Perkins | 137/240 |
| 6,086,753 A | * | 7/2000 | Ericson et al. | 210/120 |
| 7,156,896 B2 | * | 1/2007 | Schenk et al. | 96/168 |

\* cited by examiner

*Primary Examiner* — Duane Smith
*Assistant Examiner* — Phillip Shao
(74) *Attorney, Agent, or Firm* — Hall Estill Law Firm

(57) ABSTRACT

This disclosure is related to an apparatus for automatically separating spent drilling materials from air drilling operations. The apparatus includes a reservoir, a spent materials inlet, and a drill cuttings outlet. The apparatus also includes either a float system or a load cell system to actuate the drill cuttings outlet when the spent drilling materials reach a predetermined amount in the reservoir.

6 Claims, 5 Drawing Sheets

APPARATUS FOR SEPARATING SPENT DRILLING MATERIALS

CROSS-REFERENCE TO RELATED APPLICATIONS

The present application is a conversion of U.S. Provisional Application having U.S. Ser. No. 61/608,323, filed Mar. 8, 2012 which claims the benefit under 35 U.S.C. 119(e). The entire disclosure of which is hereby expressly incorporated herein by reference.

STATEMENT REGARDING FEDERALLY SPONSORED RESEARCH OR DEVELOPMENT

Not applicable.

BACKGROUND OF THE INVENTION

1. Field of the Invention

The disclosure relates to an apparatus for automatically separating spent materials recovered from air drilling operations.

2. Brief Description of Related Art

Drilling gas wells produces spent materials made up of air/gas, drill cuttings and fluid. Efficient separation of these components is important to gas well operators. To this end, a need exists for an apparatus that can automatically separate spent drilling materials into separate components.

SUMMARY OF THE INVENTION

The present disclosure is directed to an automatic materials separation apparatus. The apparatus includes a reservoir and a spent materials inlet for receiving spent drilling materials from an air drilling operation. The apparatus also includes a drill cuttings outlet for removing drill cuttings from the reservoir. The apparatus further includes a load cell system having at least one load cell for determining the weight of the spent drilling materials in the reservoir and an actuating device for opening the drill cuttings outlet when the weight of the spent drilling materials reaches a predetermined weight.

The present disclosure is related to another apparatus for automatically separating spent drilling materials. The apparatus includes a reservoir and a spent materials inlet for receiving spent drilling materials from an air drilling operation. The apparatus also includes a drill cuttings outlet for removing drill cuttings from the reservoir. The apparatus further includes a float system having a float suspendable in the spent drilling material received in the reservoir and a connector element attached to the float and the drill cuttings outlet.

DETAILED DESCRIPTION OF EXEMPLARY EMBODIMENTS

Figure 1:
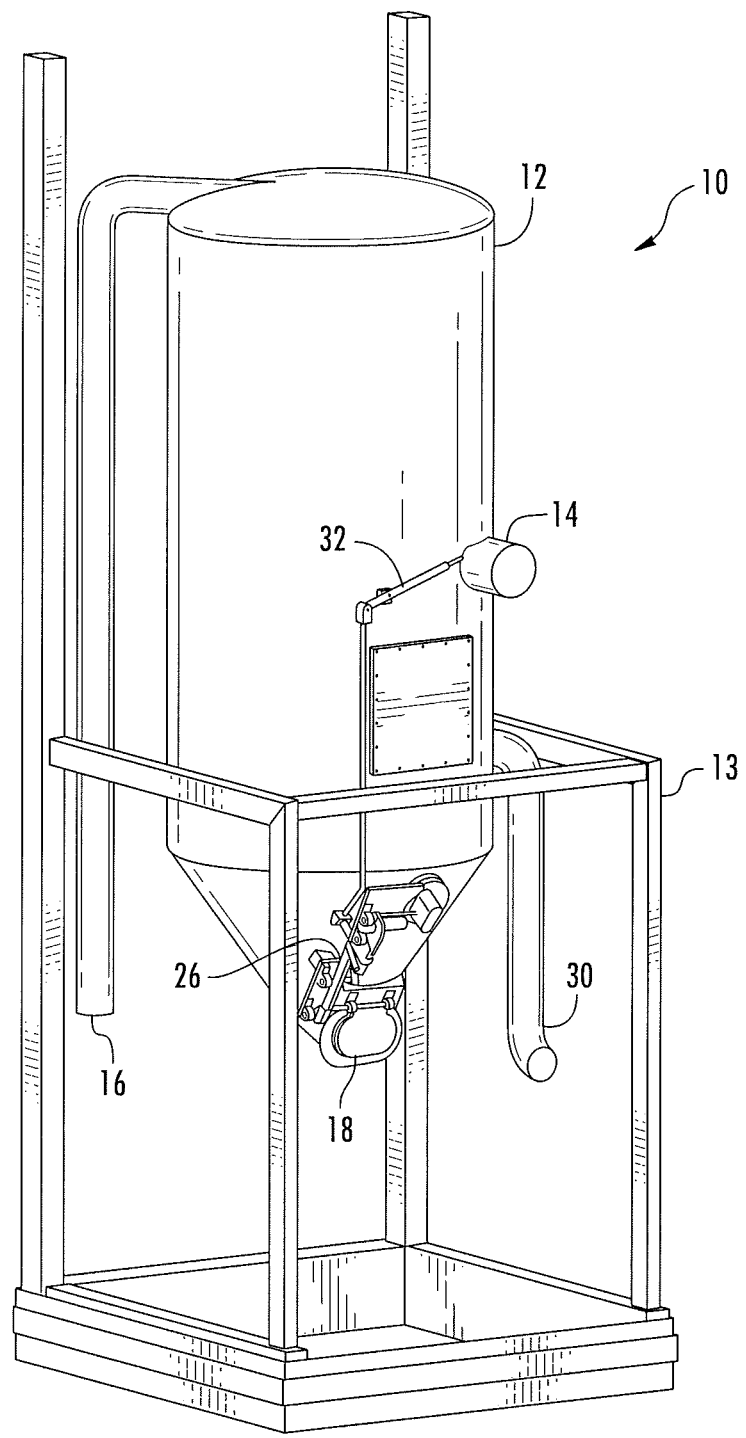
FIG. 1 is a perspective view of an automatic spent materials separation apparatus constructed in accordance with the present invention.

Before explaining at least one embodiment of the presently disclosed and claimed inventive concept(s) in detail, it is to be understood that the presently disclosed and claimed inventive concept(s) is not limited in its application to the details of construction, experiments, exemplary data, and/or the arrangement of the components set forth in the following description or illustrated in the drawings. The presently disclosed and claimed inventive concept(s) is/are capable of other embodiments or of being practiced or carried out in various ways. Also, it is to be understood that the phraseology and terminology employed herein is for the purpose of description and should not be regarded as limiting.

Figure 2:
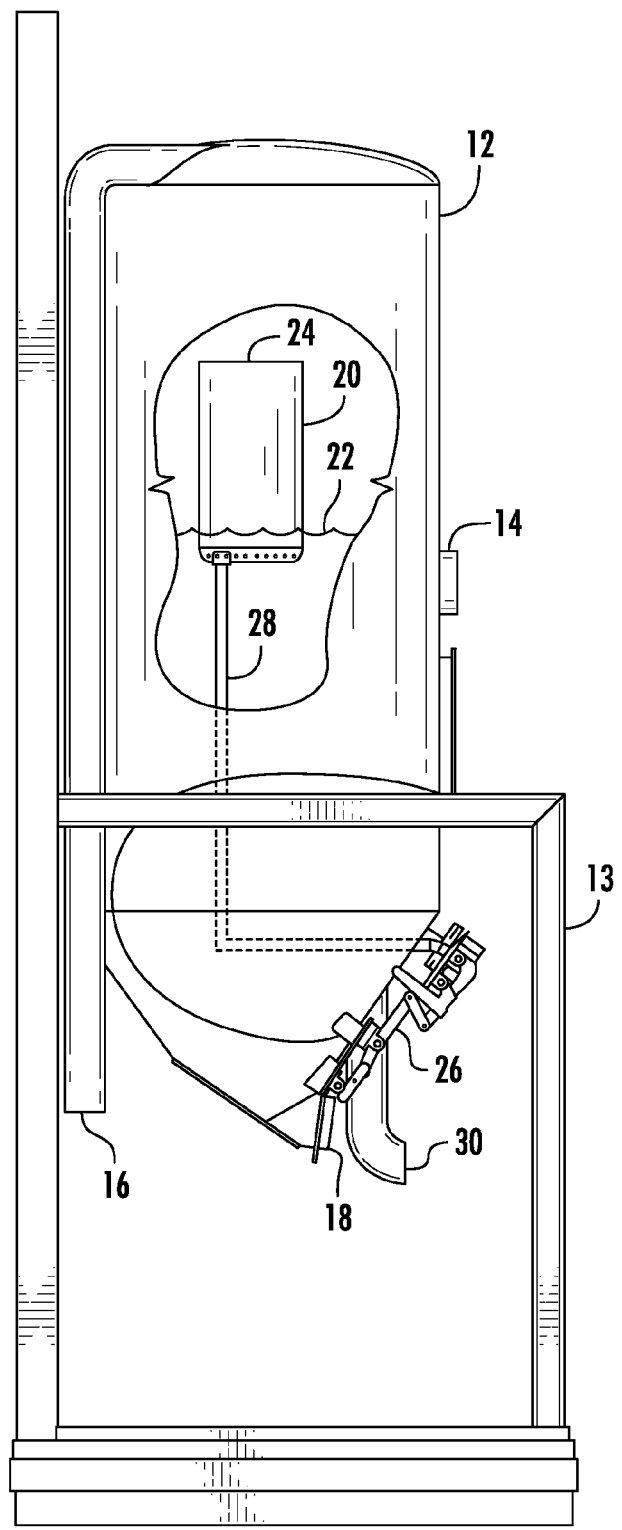
FIG. 2 is a side elevation view of an automatic spent materials separation apparatus constructed in accordance with the present invention.

As shown in FIGS. 1 and 2, the present disclosure is directed toward an automatic materials separation apparatus 10 for separating spent drilling materials from an air drilling operation. In one embodiment of the present invention, the apparatus 10 includes a reservoir 12, a spent materials inlet 14 for receiving spent materials from the air drilling operation, a gas outlet 16 at the top of the apparatus 10 for venting the air and/or gas from the spent materials entering via the spent materials inlet 14, a drill cuttings outlet 18 and a float system 20 for opening and closing the drill cuttings outlet 18 based upon fluid level 22 of drill cuttings and other fluid in the reservoir 12. The air and gas vented from the reservoir via the gas outlet 16 can be vented into the atmosphere, sent to a flare stack to be burned off, etc. The apparatus 10 can also be provided with a support structure 13 to support the apparatus 10.

The float system 20 includes a float 24 suspendable in the fluid in the reservoir 12 and a connector element 28 for connecting the float 24 in the reservoir 12 to the drill cuttings outlet 18. In another embodiment, the float system 20 further includes an actuator linkage 26 that actuates opening the drill cuttings outlet 18 and is attached to the connector element 28.

In another embodiment, the apparatus 10 is equipped with an overflow outlet 30 to remove fluid from the reservoir 12. When the reservoir 12 takes on too much fluid, the flow of drilling cuttings can be limited. The overflow outlet 30 can be opened via a valve (not shown). When the overflow outlet 30 is opened, fluid is permitted to be drained from the reservoir 12 which can increase the flow of the drilling cuttings.

In a further embodiment, the apparatus 10 can include a lever 32 linked to the drill cuttings outlet 18 to manually open the drill cuttings outlet 18 and facilitate the removal of the drill cuttings from the reservoir 12. It should be understood and appreciated that the lever 32 can be attached to the drill cuttings outlet 18 via any way known to one of ordinary skill in the art to be able to open the drill cuttings outlet 18.

Figure 3:
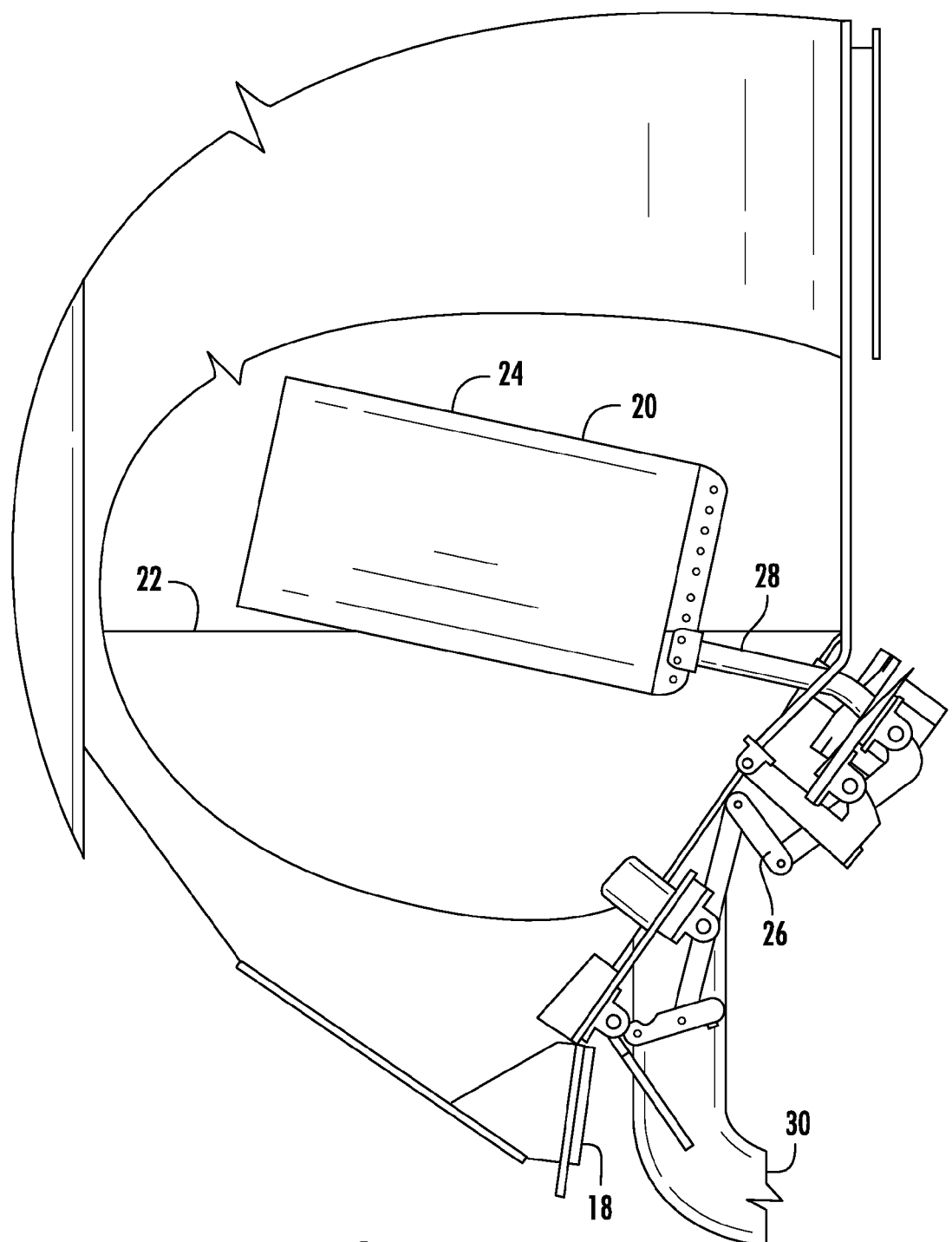
FIG. 3 is a close-up view of a portion of the automatic spent materials separation apparatus.

In use, as depicted in FIG. 3, a mixture of drill cuttings and fluid will fill up the reservoir 12. As the mixture rises, the float 24, which is suspended in the mixture, rises within the reservoir 12. Once the mixture rises to a predetermined height and causes the float 24 to reach a predetermined height in the reservoir 12, the connector element 28 of the float system 20 activates the actuator linkage 26 which then opens the drill cuttings outlet 18 to allow the mixture of drill cuttings and fluid to flow out of the drill cuttings outlet 18. Once the mixture and the float 24 descend to a certain predetermined level, the connector element 28 of the float system 20 activates the actuator linkage 26 which then closes the drill cuttings outlet 18. Once the drill cuttings outlet 18 is closed, the mixture of drill cuttings and fluid begins to rise again in the reservoir 12.

Figure 4:
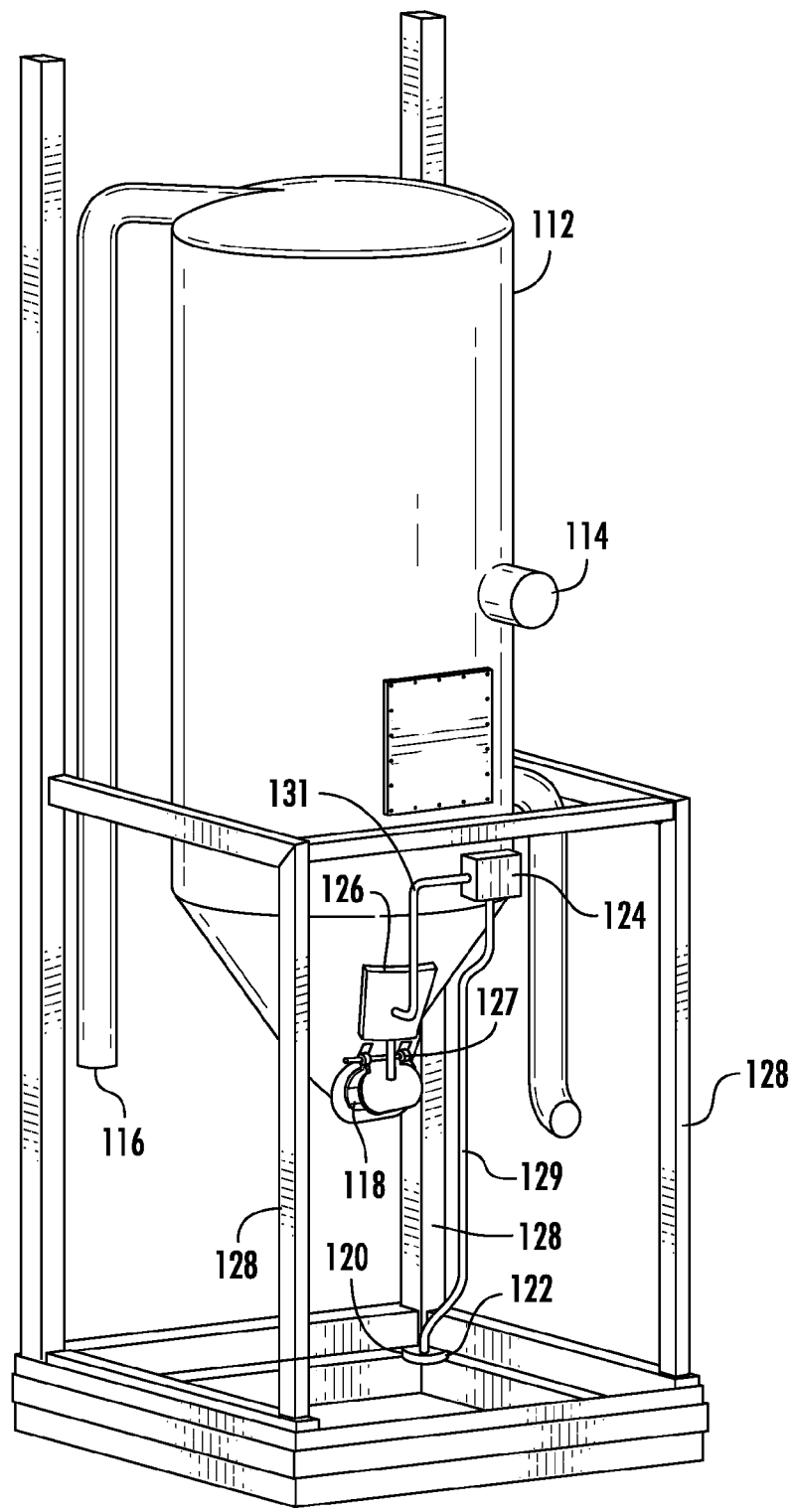
FIG. 4 is a perspective view of another embodiment of the automatic spent materials separation apparatus constructed in accordance with the present invention.
Figure 5:
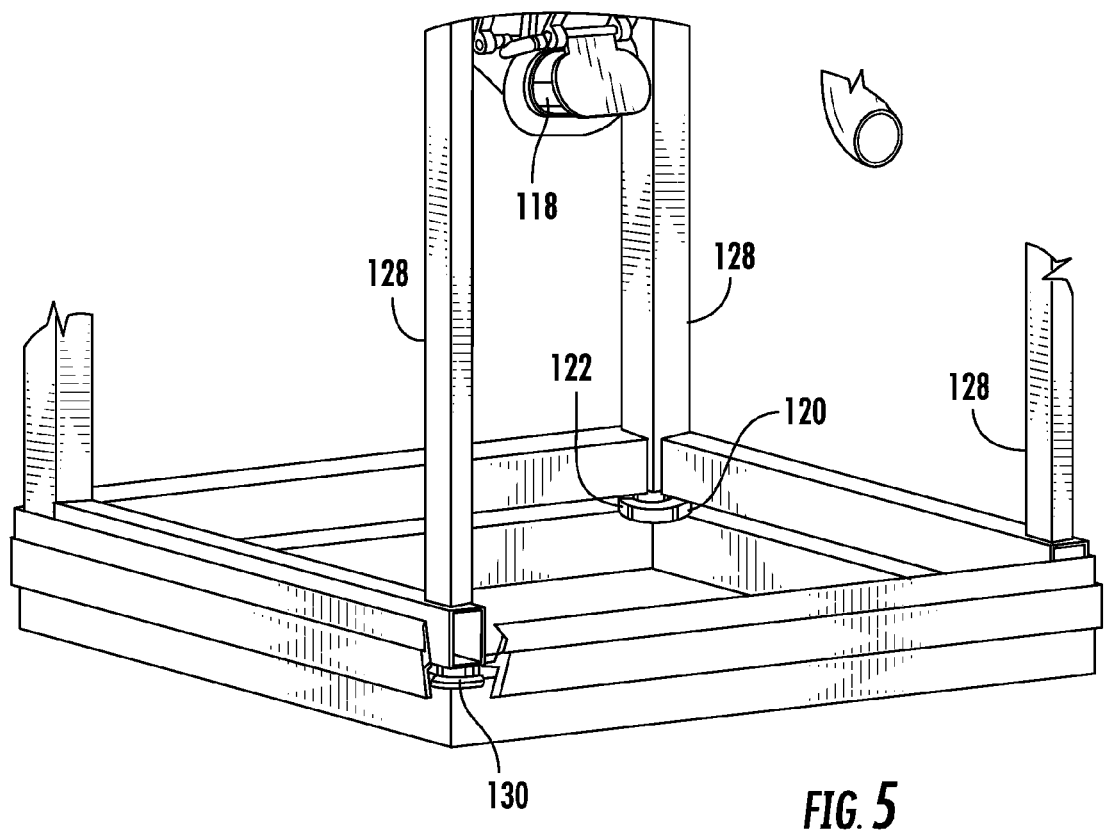
FIG. 5 is another close-up view of the automatic spent materials separation apparatus in accordance with the present invention.

In another embodiment, and shown in FIGS. 4 and 5, the apparatus 10 includes a reservoir 112, spent materials inlet 114 for receiving spent materials from the air drilling operation, a gas outlet 116 for venting air and gas from the spent materials entering via the spent materials inlet 114, a drill cuttings outlet 118 and a load cell system 120 for opening and closing the drill cuttings outlet 118 based upon the weight (or level of fluid and drill cuttings) of fluid and drill cuttings in the reservoir 112. It should be understood and appreciated that the load cell system 120 can be configured to use the weight of the apparatus 10, plus the fluid and drill cuttings, or the weight of the fluid and drill cuttings alone.

The load cell system 120 includes at least one load cell 122 for ultimately determining the weight of the spent drilling materials in the reservoir 112, at least one relay switch 124 in communication with the at least one load cell 122, and an actuating device 126 for opening and closing the drill cuttings outlet 118 via an actuating link 127. The actuating link can be any device known in the art capable of receiving a signal from the relay switch 124 and opening the drill cuttings outlet 118. The actuating device 126 is in communication with the at least one relay switch 124 and is activated by the at least one relay switch 124. The communication links 129 and 131 that connect the at least one load cell 122 and the at least one relay switch 124 and connects the at least one relay switch 124 with the actuating device 126 can be any type of communication link known in the art, such as wired or wireless. When there are a plurality of load cells 122, the load cells 122 can also be in communication via a wired connection and/or a wireless connection (not shown). In one embodiment, the actuating device 126 can be a hydraulic cylinder (not shown) that is attached to the drill cuttings outlet 118 to open and close the outlet 118. It should be understood and appreciated that the actuating device 126 can be any mechanism known in the art that can open and close the drill cuttings outlet 118. It should also be understood and appreciated that the at least one load cell 122 can determine the weight of any combination of the reservoir 112 and/or the entire apparatus 10 to determine the weight of the spent drilling materials in the reservoir 112.

The at least one load cell 122 can be configured in various ways. In one embodiment, the at least one load cell 122 can be a single platform (not shown) that the apparatus 10 is disposed on. In another embodiment, the support structure 13 can include a plurality of support members 128 and the load cell system 120 can include separate load cells 130 which can be disposed beneath each support member 128. In this embodiment, the separate load cells 130 can be in communication to determine the weight of the spent drilling materials in the reservoir 112.

In use, a mixture of drill cuttings and fluid fill up the reservoir 112. Once the reservoir 112 and/or the apparatus 10 reaches a predetermined weight, the at least one load cell 122 sends a signal via the at least one relay switch 124 to the actuating device 126 to open the drill cuttings outlet 118 to allow the mixture of drill cuttings and fluid to flow out the drill cuttings outlet 118. Once the weight of the apparatus 10 and/or the reservoir 112 descends to a certain predetermined weight, the at least one load cell 122 sends another signal via the at least one relay switch 124 to the actuating device 126, which then closes the drill cuttings outlet 118. Once the drill cuttings outlet 118 is closed, the mixture of drill cuttings and fluid begins to rise in the reservoir 112, thus increasing the weight of the apparatus 10 and/or the reservoir 112.

From the above description, it is clear that the inventive concepts disclosed and claimed herein are well adapted to carry out the objects and to attain the advantages mentioned herein, as well as those inherent in the invention. While various embodiments of the inventive concepts have been described for purposes of this disclosure, it will be understood that numerous changes may be made which will readily suggest themselves to those skilled in the art and which are accomplished within the spirit of the inventive concepts disclosed and as defined in the appended claims.

What is claimed is:

1. An automatic materials separation apparatus, the apparatus comprising:
   a reservoir;
   a spent materials inlet for receiving spent drilling materials from an air drilling operation;
   a drill cuttings outlet for removing drill cuttings from the reservoir;
   a load cell system having at least one load cell for determining the weight of the spent drilling materials in the reservoir and an actuating device for opening the drill cuttings outlet when the weight of the spent drilling materials reaches a predetermined weight.

2. The apparatus of claim 1 further comprising a gas outlet for venting air and gas from the spent materials.

3. The apparatus of claim 1 further comprising a support structure to support the reservoir.

4. The apparatus of claim 1 further comprising an overflow outlet to remove fluid from the reservoir and facilitate the flow of drill cuttings.

5. The apparatus of claim 1 further comprising a lever linked to the drill cuttings outlet to manually open the drill cuttings outlet.

6. The apparatus of claim 1 wherein the load cell system includes a plurality of load cells positioned beneath support members supporting the reservoir.

* * * * *